United States Patent [19]
Miyazaki et al.

[11] Patent Number: 5,748,834
[45] Date of Patent: May 5, 1998

[54] RECORDING/REPRODUCING SYSTEM WHEREIN AN ANALOG STEREO AUDIO FORMAT IS MAINTAINED AND HALF THE ANALOG STEREO SIGNAL IS REPLACED BY A DIGITAL STEREO AUDIO SIGNAL

[75] Inventors: Haruhito Miyazaki; Koichi Ishitoya, both of Tokorozawa, Japan

[73] Assignee: Pioneer Electronic Corporation, Japan

[21] Appl. No.: 835,962

[22] Filed: Apr. 11, 1997

Related U.S. Application Data

[63] Continuation of Ser. No. 341,066, Nov. 16, 1994, abandoned.

[30] Foreign Application Priority Data

Nov. 19, 1993 [JP] Japan ..................... 5-291071

[51] Int. Cl.$^6$ ............ H04N 5/91; H04N 5/928; H04N 7/04; H04N 7/52
[52] U.S. Cl. .................. 386/96; 386/98; 386/104; 386/105
[58] Field of Search ................ 386/39, 75, 95–107; 381/2–4; 369/3–5, 86, 89, 90–92

[56] References Cited

U.S. PATENT DOCUMENTS

| | | | |
|---|---|---|---|
| 4,382,299 | 5/1983 | Dieterich | 371/8 |
| 4,660,099 | 4/1987 | Sugiyama et al. | 358/342 |
| 4,782,402 | 11/1988 | Kanamaru | 358/343 |
| 4,821,097 | 4/1989 | Robbins | 358/143 |
| 5,003,407 | 3/1991 | Nakano et al. | 360/19.1 |
| 5,023,707 | 6/1991 | Briggs | 358/343 |
| 5,130,816 | 7/1992 | Yoshio | 358/341 |
| 5,157,557 | 10/1992 | Oshashi et al. | 360/32 |
| 5,159,500 | 10/1992 | Oguro et al. | 360/19.1 |
| 5,270,992 | 12/1993 | Yasuda et al. | 369/53 |
| 5,325,127 | 6/1994 | Dinsel | 348/473 |
| 5,357,284 | 10/1994 | Todd | 348/486 |
| 5,414,567 | 5/1995 | Amada et al. | 360/19.1 |

FOREIGN PATENT DOCUMENTS 2 087 627  5/1982  United Kingdom.

OTHER PUBLICATIONS

Alisouskas, Digital and Data Communications, pp. 132–134, 1985.
Bingham, John, Multicarrier Modulation for data transmission:, Ieee, pp. 5–14, May 1990.
Higurashi, Seiji, Digital Sound Systems of S–VHS VCR, IEEE, pp. 642–646, Aug. 1990.

*Primary Examiner*—Tommy P. Chin
*Assistant Examiner*—David R. Vincent
*Attorney, Agent, or Firm*—Nixon & Vanderhye

[57] ABSTRACT

An information recording method records a plurality of audio signals to be recorded onto one record medium by assigning the audio signals respectively to a plurality of channels prescribed by carrier waves which have frequencies different from each other, wherein a digital signal is assigned to one of the plurality of channels in place of one audio signal.

12 Claims, 9 Drawing Sheets

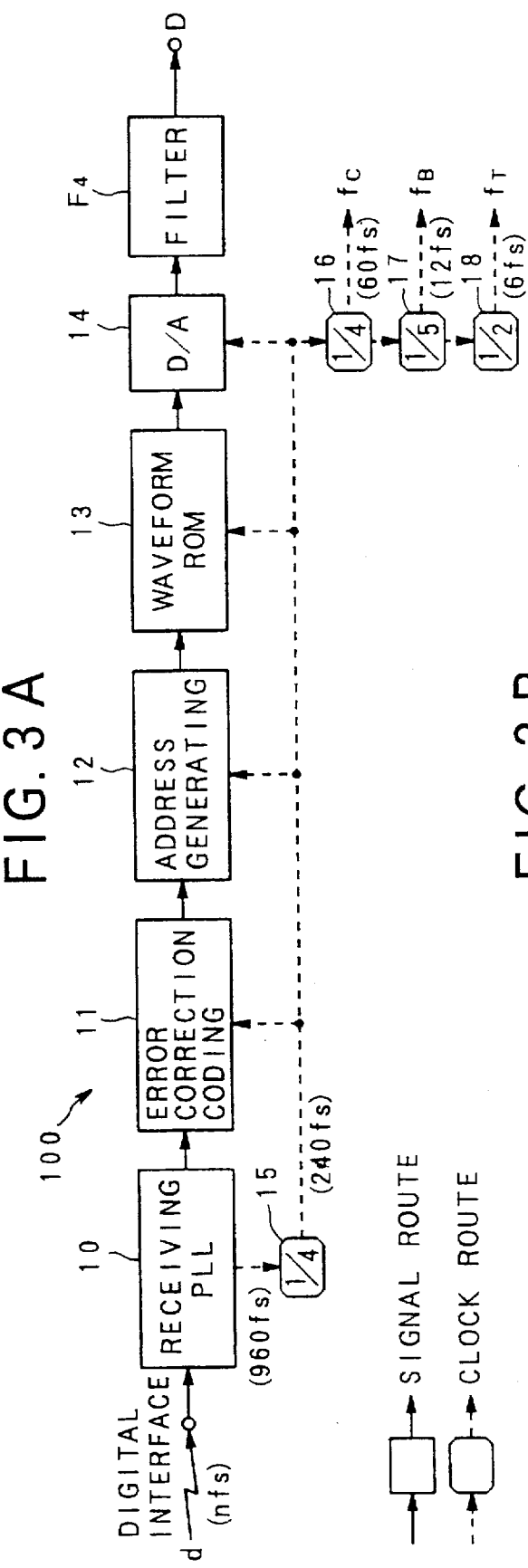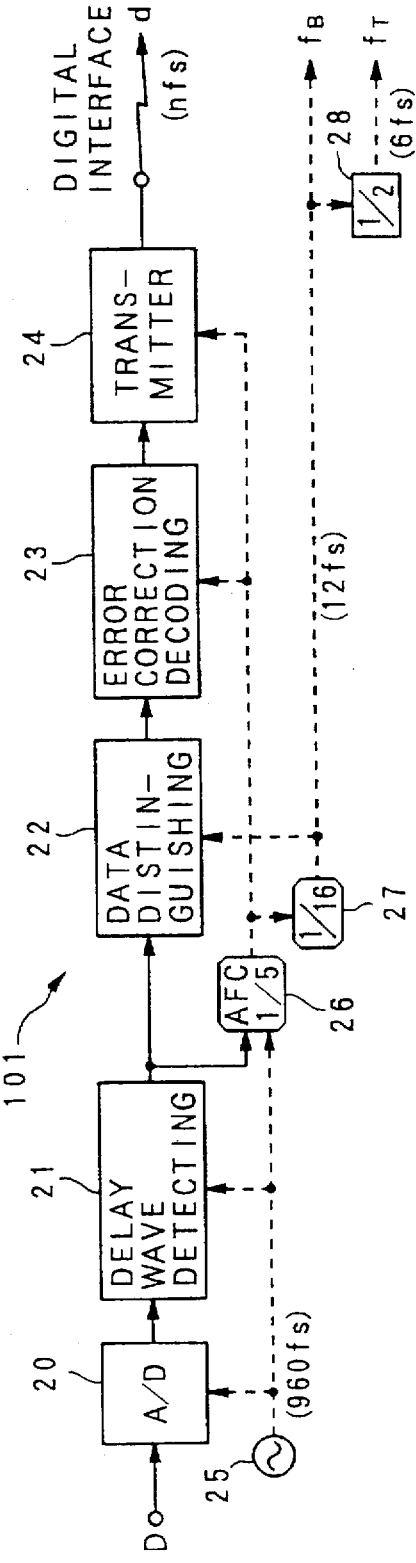

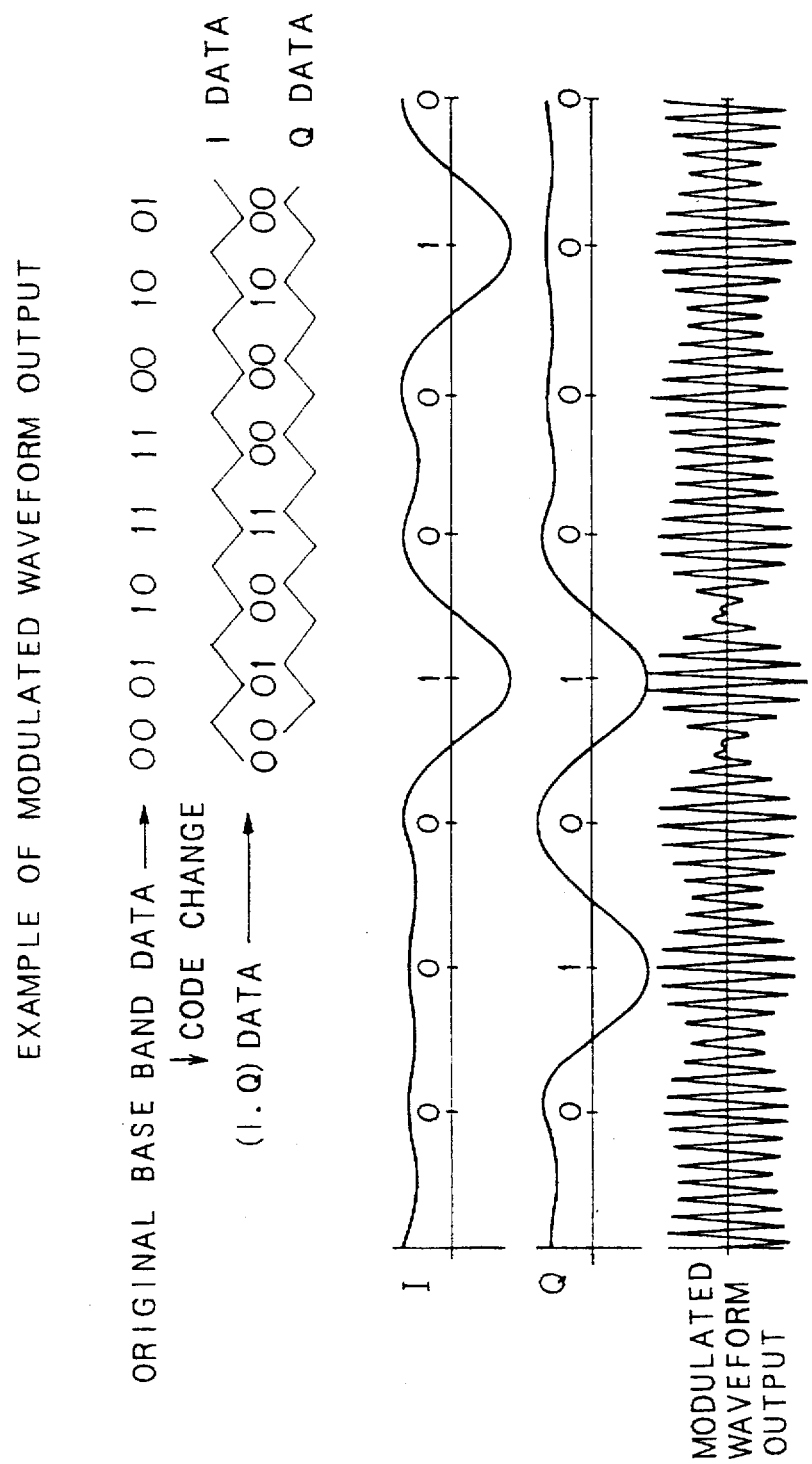

RECORDING/REPRODUCING SYSTEM WHEREIN AN ANALOG STEREO AUDIO FORMAT IS MAINTAINED AND HALF THE ANALOG STEREO SIGNAL IS REPLACED BY A DIGITAL STEREO AUDIO SIGNAL

This is a Rule 62 File Wrapper Continuation of application Ser. No. 08/341,066, filed 16 Nov. 1994, now abandoned.

BACKGROUND OF THE INVENTION

1. Field of the Invention

The present invention generally relates to an information recording method, an information recording apparatus and an information recording and reproducing apparatus, and more particularly to an information recording method, an information recording apparatus and an information recording and reproducing apparatus, which are used for multiplex-recording digital information coded with high efficiency on the basis of an existing format for multiplex-recording video information and audio information.

2. Description of the Related Art

As a recording medium to record a video signal with an audio signal etc., there are various media such as a magnetic tape and a video disc. At the same time, there are various recording formats (i.e. recording methods) to record information on these recording media. Especially, because of the demand to improve the quality of the information, there is a method of recording the audio signal, which is digitally modulated, together with the audio signal, which is recorded in the conventional analog form. In the field of the video disc, there is a format to multiplex and record digital signals.

The spectrum of the signal recorded by this recording method of the video disc, which multiplexes the digital signals, is shown in FIG. 9A. A video FM carrier wave P which is obtained by frequency-modulating a first carrier wave (8.1 [MHz]) by a video signal, audio FM carrier waves $A_1$ and $A_2$ which are obtained by frequency-modulating a second carrier wave (2.30 [MHz]) and a third carrier wave (2.81 [MHz]) by left and right audio signals for stereo, and an EFM (Eight to Fourteen Modulation) signal E which is obtained by EFM-modulating digital data and limiting the band range of it by a cut-off frequency of 1.75 [MHz], are superimposed in the record signal as shown in FIG. 9A.

On the other hand, in the field of movies, a film for theater-use is produced by use of a noise reduction technology, in which a high sound quality multi-channel digital sound is coded with high efficiency and is recorded. By this technique in the movie, a development of multi-channelling for home-use in the future is expected, so that the multi-channel audio method for home-use is under research, which allows the reproduction of a video software produced by the technique of high efficiency digital coding, in the field of audio and video apparatuses for home-use.

However, in the presently available recording format of the video disc provided with a digital audio capability, it is not possible to record a new signal by forming a new frequency band, since there does not exist a frequency band range which can be freely used as shown in FIG. 9A. Further, in case of improving the existing recording format, since the compatibility with the existing technology should be considered, it becomes necessary to propose a new method of separately recording a new signal while leaving the present record signal as it is.

As a method to solve the above mentioned problem, there may be proposed (1) a method of multiplexing the audio signal to the vertical blanking period of the video signal, (2) a method of performing a deep layer recording in order to form a new recordable area, and so on.

However, in the method (1) of multiplexing the audio signal to the vertical blanking period of the video signal, there are some problems. Namely, since the vertical blanking period is short and the recording capacity is small, it is difficult to perform recording with high bit rate. Even if high efficiency modulating method is employed, it will be poor to the bit error, and the cost will be increased. On the other hand, in the method (2) of forming a new recordable area by use of the deep layer recording technique, a new reproducing head and a new reproducing circuit become necessary, and the disturbance such as a crosstalk to another record information will be increased.

SUMMARY OF THE INVENTION

It is therefore an object of the present invention to provide a method of recording information, an apparatus for recording the information, an apparatus for reproducing the information and an apparatus for recording and reproducing the information, which can additionally record a new digital signal on a recording medium while a compatibility with the existing recording format is maintained.

The above object of the present invention can be achieved by a first information recording method of recording a plurality of audio signals to be recorded onto one record medium by assigning the audio signals respectively to a plurality of channels prescribed by carrier waves which have frequencies different from each other, wherein a digital signal is assigned to one of the plurality of channels in place of one audio signal.

According to the first information recording method of the present invention, it becomes possible to record the digital signal by assigning one channel to the digital signal in place of one audio signal among a plurality of channels corresponding to the audio signals to be recorded onto one record medium. In this manner, the digital signal can be added to the record information while the existing recording format is substantially maintained as it is.

The above object of the present invention can be also achieved by a second information recording method, which includes all of the features of the above described first information recording method, wherein the digital signal is sampled by a predetermined sampling frequency, and the carrier wave prescribing the channel assigned to the digital signal has a frequency which is integer multiple of the predetermined sampling frequency.

According to the second information recording method of the present invention, since the frequency of the carrier wave prescribing the channel assigned to the digital signal has a frequency which is integer multiple of the predetermined sampling frequency, the cycle of the frequency obtained by integer-multiplying the sampling frequency and the cycle of the frequency obtained by dividing the frequency of the carrier wave, have a predetermined phase relationship with the digital signal, so that they can be directly used as the timing information for the PSK (Phase Shift Keying) modulation and demodulation. In this manner, the optimum relationship between the sampling frequency and the frequency of the carrier wave is achieved in the above described first information recording method of the present invention.

The above mentioned object of the present invention can be also achieved by a first information recording apparatus for recording a plurality of audio signals to be recorded onto one record medium by assigning the audio signals respectively to a plurality of channels prescribed by carrier waves which have frequencies different from each other. The first information recording apparatus is provided with: an error correction coding device, to which an input digital signal sampled by a predetermined sampling frequency is inputted, for adding an error correction code to the input digital signal and generating a digital signal for recording; a digitally modulating device for digitally-modulating the digital signal for recording by a carrier wave for digital modulation, which prescribes one of the plurality of channels; and a filtering device for filtering the digital signal for recording, which is digitally-modulated by the digitally modulating device, wherein the carrier wave for digital modulation has a frequency which is integer multiple of the predetermined sampling frequency.

According to the first information recording apparatus of the present invention, the error correction coding device adds an error correction code to the input digital signal, which is sampled by the predetermined sampling frequency, and generates a digital signal for recording. The digitally modulating device digitally-modulates the digital signal for recording by a carrier wave for digital modulation, which prescribes one of the plurality of channels. The filtering device filters the digital signal for recording. Here, since the carrier wave for digital modulation has a frequency which is integer multiple of the predetermined sampling frequency, it can be used as a timing signal for the PSK method in the digitally-modulating device. In this manner, the digital signal can be efficiently multiplexed while the existing recording format is substantially maintained as it is.

The above mentioned object of the present invention can be also achieved by a second information recording apparatus which includes all of the features of the above described first information recording apparatus of the present invention. In the second information recording apparatus, the digitally modulating device is provided with: a timing generator device for generating a timing signal on the basis of the predetermined sampling frequency; a waveform address generating device, to which the digital signal for recording is inputted on the basis of the timing signal, for generating an address corresponding to the digital signal for recording; a waveform storing device for storing a plurality of QPSK (Quad PSK) waveform data, and generating one QPSK waveform data corresponding to the address generated by the waveform address generating device; and a D/A converting device for digital-to-analog converting the QPSK waveform data generated from the waveform storing device.

According to the second information recording apparatus of the present invention, the timing generator device generates a timing signal on the basis of the predetermined sampling frequency. For example, the timing generator device divides the predetermined sampling frequency to output the timing signal having a predetermined phase relationship with the digital signal. To the waveform address generating device, the digital signal for recording is sequentially inputted on the basis of the timing signal. The waveform address generating device generates an address corresponding to the digital signal for recording in the waveform storing device. The waveform storing device sequentially generates the QPSK waveform data corresponding to this address. Then, the D/A converting device digital-to-analog converts this QPSK waveform data. In this manner, the QPSK method which is hardly influenced by the amplitude drift of the carrier wave by use of a rather simply constructed modulating device, can be realized according to the second information recording apparatus of the present invention.

The above object of the present invention can be achieved by an information reproducing apparatus for reproducing a record medium, which is recorded by the above described first or second information recording method of the present invention. The information reproducing apparatus is provided with: a reading device for reading signals from the record medium; a filtering device for filtering the read signal to pass only a predetermined modulated carrier wave; a digitally demodulating device for demodulating the predetermined modulated carrier wave to generate a demodulated digital signal; and an error correction decoding device, to which the demodulated digital signal is inputted, for performing an error correction decoding operation to output a complemented digital signal.

According to the information reproducing apparatus of the present invention, the filtering device filters the read signal to pass only a predetermined modulated carrier wave, to the digitally demodulating device. The digitally demodulating device demodulates the predetermined modulated carrier wave to generate a demodulated digital signal on the basis of a predetermined digitally modulating method. The error correction decoding device performs an error correction decoding operation to output a complemented digital signal. Thus, the digital signal to which the error correction has been completed can be outputted from the information reproducing apparatus. In this manner, the newly multiplexed digital signal can be reproduced according to the information reproducing apparatus of the present invention.

In this information reproducing apparatus, it is preferable that the digital signal is sampled by a predetermined sampling frequency, and the carrier wave prescribing the channel assigned to the digital signal has a frequency which is integer multiple of the predetermined sampling frequency when the record medium is recorded by the information recording method. In this case, since the frequency of the carrier wave prescribing the channel assigned to the digital signal has a frequency which is integer multiple of the predetermined sampling frequency, the cycle of the frequency obtained by integer-multiplying the sampling frequency and the cycle of the frequency obtained by dividing the frequency of the carrier wave, have a predetermined phase relationship with the digital signal, so that they can be directly used as the timing information for the PSK modulation and demodulation.

The above mentioned object of the present invention can be also achieved by an information recording and reproducing apparatus, which is provided with the above described first or second information recording apparatus and the above described information reproducing apparatus of the present invention.

According to the information recording and reproducing apparatus of the present invention, the digital signal coded with high efficiency can be recorded and reproduced in place of the audio signal on the record medium.

In one aspect of the present invention, in this information recording and reproducing apparatus, it is preferable that the digital signal is sampled by a predetermined sampling frequency, and the carrier wave prescribing the channel assigned to the digital signal has a frequency which is integer multiple of the predetermined sampling frequency when the record medium is recorded by the information recording apparatus. In this case, since the frequency of the carrier wave prescribing the channel assigned to the digital signal has a frequency which is integer multiple of the predetermined sampling frequency, the cycle of the frequency obtained by integer-multiplying the sampling frequency and the cycle of the frequency obtained by dividing the frequency of the carrier wave, have a predetermined phase relationship with the digital signal, so that they can be directly used as the timing information for the PSK modulation and demodulation.

In another aspect of the present invention, in this information recording and reproducing apparatus, it is preferable that the digitally modulating device is provided with: a timing generator device for generating a timing signal on the basis of the predetermined sampling frequency; a waveform address generating device, to which the digital signal for recording is inputted on the basis of the timing signal, for generating an address corresponding to the digital signal for recording; a waveform storing device for storing a plurality of QPSK waveform data, and generating QPSK waveform data corresponding to the address generated by the waveform address generating device; and a D/A converting device for digital-to-analog converting the QPSK waveform data generated from the waveform storing device. In this case, the timing generator device generates a timing signal on the basis of the predetermined sampling frequency. The waveform address generating device generates an address corresponding to the digital signal for recording in the waveform storing device. The waveform storing device sequentially generates the QPSK waveform data corresponding to this address. Then, the D/A converting device digital-to-analog converts this QPSK waveform data. In this manner, the QPSK method can be realized according to the information recording and reproducing apparatus of the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3, which consist of FIG. 3A and FIG. 3B, are block diagrams of a modulation block and a demodulation block respectively, of the first embodiment;

FIG. 6 is a diagram showing one example of a modulated waveform output in the second embodiment;

DETAILED DESCRIPTION OF THE PREFERRED EMBODIMENTS

Referring to the accompanying drawings, an embodiment of the present invention will be now explained.

First Embodiment

The first embodiment is such an embodiment that, in a method of recording a video disc in which frequency-modulated analog video and audio signals, and a digital EFM signal are superimposed, a new digital signal is further superimposed onto a record area for the conventional audio signal $A_2$, so as to make it possible to record the digital signal coded with high efficiency.

Figure 1A:
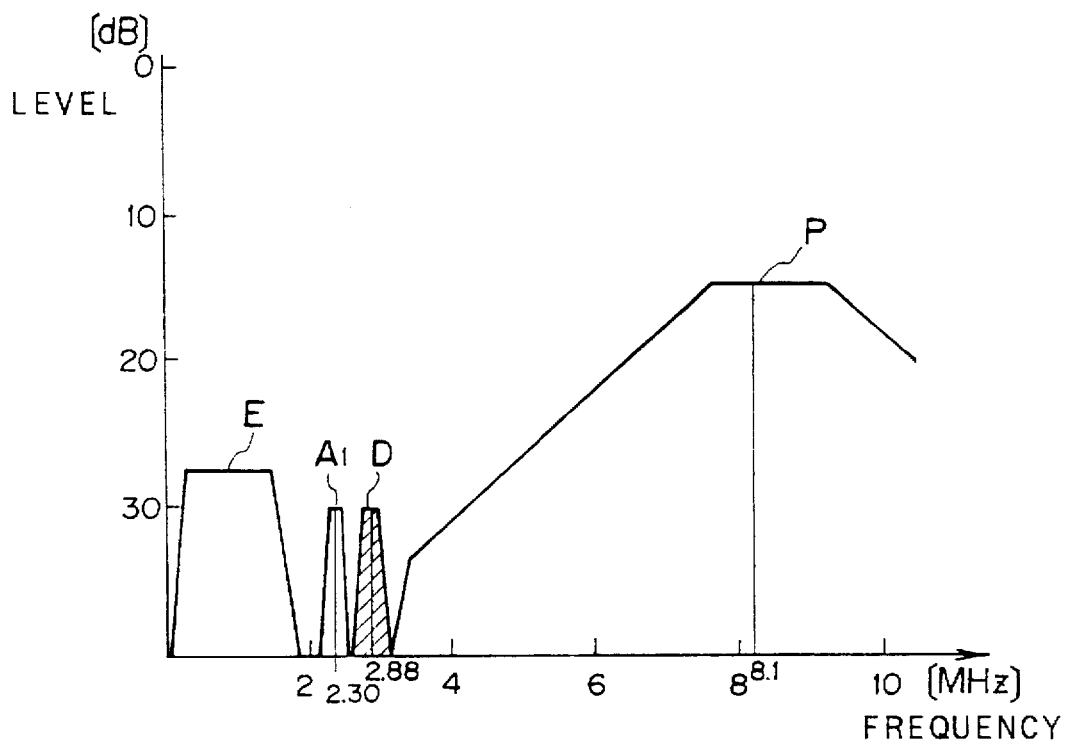
FIG. 1, which consist of FIG. 1A and FIG. 1B, are graphs each showing a spectrum of a record signal according to a first embodiment of the present invention.

FIG. 1 shows a spectrum of a record signal in the first embodiment according to an information recording method of the present invention.

Figure 9A:
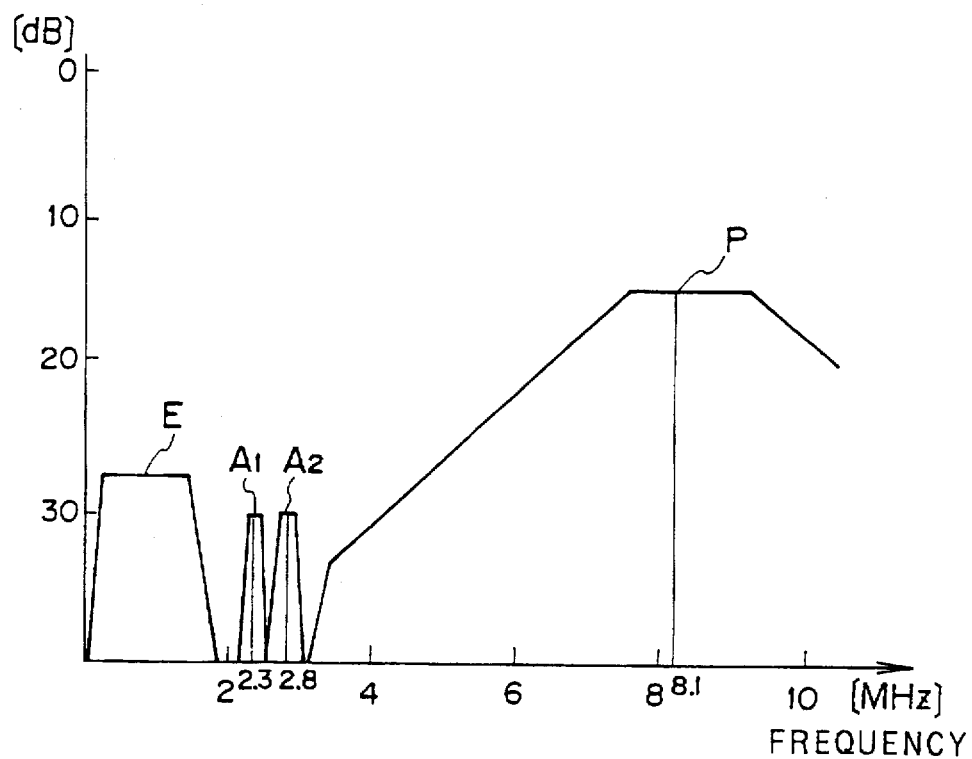
FIG. 9, which consist of FIG. 9A and FIG. 9B, are graphs each showing a spectrum of a record signal of a video disc provided with a digital audio sound, according to a related art.

In FIG. 1, a reference mark P denotes a video FM carrier wave, which has a signal frequency band range having a frequency deviation 1.7 [MHz] with a center at a central frequency of 8.5 [MHz], and which is obtained by frequency-modulating a carrier wave by a video signal p. A reference mark $A_1$ denotes an audio FM carrier wave, which is obtained by frequency-modulating a carrier wave having the frequency of 2.30 [MHz] by an audio signal $a_1$ (which is an analog signal), and the frequency deviation thereof is ±100 [kHz]. A reference mark D denotes a digitally modulated carrier wave, which is specially related to the present invention, and is obtained by digitally modulating a carrier wave having a frequency of 2.88 [MHz] by a digital signal d. In the conventional recording format, in the frequency band range of the digitally modulated carrier wave D, there exists the audio FM carrier wave $A_2$ related to the audio signal $a_2$ (as shown in FIG. 9), and thus the audio signals $a_1$ and $a_2$ are respectively used as a half channel audio signal of the stereo audio sound. A reference mark E denotes an EFM signal which is obtained by PCM-coding (Pulse Code Modulation—coding) the audio signal $a_0$ of the two channels of the stereo sounds etc. by 16 bit, and by further applying an EFM modulating process to it. The EFM signal E has a cut-off frequency of 1.75 [MHz], and is superimposed on the low frequency band which is not higher than 2 [MHz] where the analog video and audio signals are not recorded.

Here, as a method of newly recording an audio signal coded with high efficiency in the digital multi-channels while making the best use of the existing recording formats related to the video discs, it is investigated whether or not the frequency arrangement as shown in FIG. 1 is applicable.

As a technique for coding the digital signal with high efficiency, a noise reduction system of the Dolby Research Center is well known. In this noise reduction system, there exists a format for coding with high efficiency, which is called "AC-3 standard".

In the present embodiment, in order to record a digital signal based on this AC-3 standard, the required record information volume is grasped.

In this AC-3 standard, the digital audio sound requires 5.1 channels in total i.e. the front 3 channels of the left L, the right R and the center S, the 2 channels of the surround stereo audio sound, and the 0.1 channel exclusive for the base sound. The AC-3 standard performs the bit reduction by means of the dynamic bit assignment so that it improves the characteristic thereof to be as high as the quantifying characteristic equivalent to 20 bits on the acoustic sense. The bit rates may be set to some values. It may be, for example, 384 [kbps] as a typical value. The sampling frequency fs may be freely determined in the system. Here, it is determined that fs=48 [kHz] for the sake of convenience. Further, the bit rates required for recording, becomes a value obtained by adding the sub-code area for the future extension and the redundant data for the error correction, onto the AC-3 bit rate.

Here, the modulation method of digitally modulating this AC signal is considered.

As a digital modulating method for transmitting the digital signal, there are the ASK (Amplitude Shift Keying) method, the PSK (Phase Shift Keying) method, the FSK (Frequency Shift Keying) method, the MSK method and so on.

In case of using the ASK method for the video disc, since the amplitude of the RF (Radio Frequency) signal may be drifted due to a scratch, dirt etc. of the recording surface of the disc, the bit error ratio is degraded. Thus, the ASK method is not suitable here. On the other hand, in case of using the FSK method, when the analog signal is superimposed, the disturbance to the analog signal may be so large that the selection of the frequency is difficult in case that the frequency band range to superimpose the digital signal is narrow.

Therefore, in the present embodiment, the PSK method is employed which has the advantageous features that the band range restriction is possible, it hardly disturbs another signal, and the noise immunity (anti-noise characteristic) is good.

In the PSK methods, as modulation methods excellent in the efficiency, which have 2 bits-four conditions ($0, \pi/2, \pi, 3\pi/2$), there are various modulating method such as the QPSK (Quad Phase Shift Keying) method, the $\pi/4$ QPSK method and the offset QPSK method. Among those methods, the QPSK method has the sharpest phase amplitude change. Because of this characteristic, the phase amplitude change can be easily detected by an output restriction circuit (drop out correction circuit) such as a drop out sensor. Thus, the possibility that the digital signal is outputted as a noise when the digital signal is inputted to the analog demodulation system, can be diminished in great degrees. Further, the delay wave detecting circuit in the demodulation apparatus can easily digitize the signal, and the band range restriction is possible without distortion by use of a roll off filter.

Further, in the PSK methods, it is necessary to generate 4 phase conditions, which have the predetermined phase differences (e.g. $\pi/2$ in the QPSK method), from the bit conditions of two bits. If the relationship between the sampling frequency and the carrier wave frequency is set to be integer multiple relationship, the cycle of the frequency obtained by dividing the wave carrier by the predetermined integer ratio, has a certain time relationship with the carrier wave. Thus, by examining the bit condition by this cycle, the carrier waveform can be generated without losing the synchronization. Consequently, a special synchronization circuit is not necessary, and the modulating and demodulating circuit can be easily constructed.

As described above, the bit rate is calculated under the condition that the digital modulation method is set to the PSK method, and that the total record bit rate is selected to be the integer multiple of the sampling frequency fs, in order to achieve the simplicity of the modulating and demodulating circuit.

Assuming that the information volume necessary for the sub code area is 36 [kbps] and the information volume necessary for the redundant bits is 156 [kbps], the following relationship is concluded.

$$\text{recording bit rate} = 384 + 36 + 156 = 576 \text{ [kbps]} = 12 f_s$$

This expression means that the integer multiple of the sampling frequency fs coincides with the recording bit rate. Thus, it is sufficient to select the frequency of the carrier wave to be the integer multiple of the bit rate.

Next, in the present embodiment, the FM carrier wave $A_2$ related to the audio signal $a_2$ out of the audio signals $a_1$ and $a_2$, is replaced by the digitally modulated carrier wave D related to the AC-3 signal. At that time, it is examined whether or not the digitally modulated carrier wave D can be recorded in the frequency band range of only 1 channel for the audio FM carrier wave.

Figure 9B:
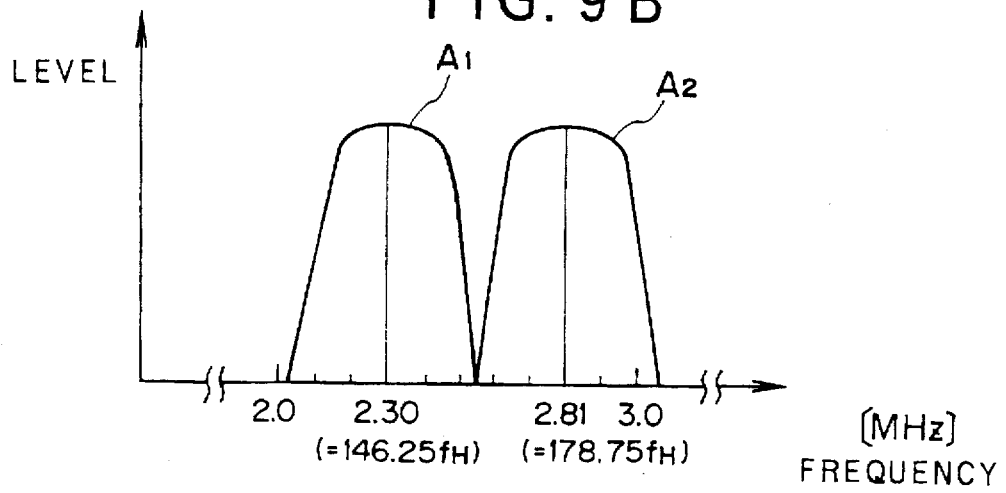

The conventional audio FM carrier waves $A_1$ and $A_2$ have the frequency spectrum as shown in FIG. 9B, each of which is set to have the frequency of the predetermined times of the horizontal synchronization frequency $f_H$ of the video FM carrier wave P with considering the high frequency disturbance onto the other frequencies (i.e. the carrier wave frequency of the audio signal $a_1$: $f_{CA1}$=2.30 [MHz]=146.25 $f_H$, the carrier wave frequency of the audio signal $a_2$: $f_{CA2}$=2.81 [MHz]=178.75 $f_H$). Further, they have the characteristic in the frequency displacement width $\Delta f$=100 to 150 [kHz] (−3 [dB]).

On the other hand, in case that the AC-3 signal is PSK-modulated, if the transmission and reception allotment is done with the roll off of 100% in order to remove the extra high frequency component, it becomes that the frequency band range $\Delta f$=144 [kHz] (−3 [dB]). Namely, the band range width substantially becomes the same as that of the frequency modulated audio signal even if the band range restriction is not strictly applied. Consequently, it is understood that the digitally modulated carrier wave D of the AC-3 signal which is PSK-modulated, can be inserted to the frequency band width, which is owned by the audio FM carrier wave $A_2$ related to the conventional audio signal $a_2$.

Figure 1B:
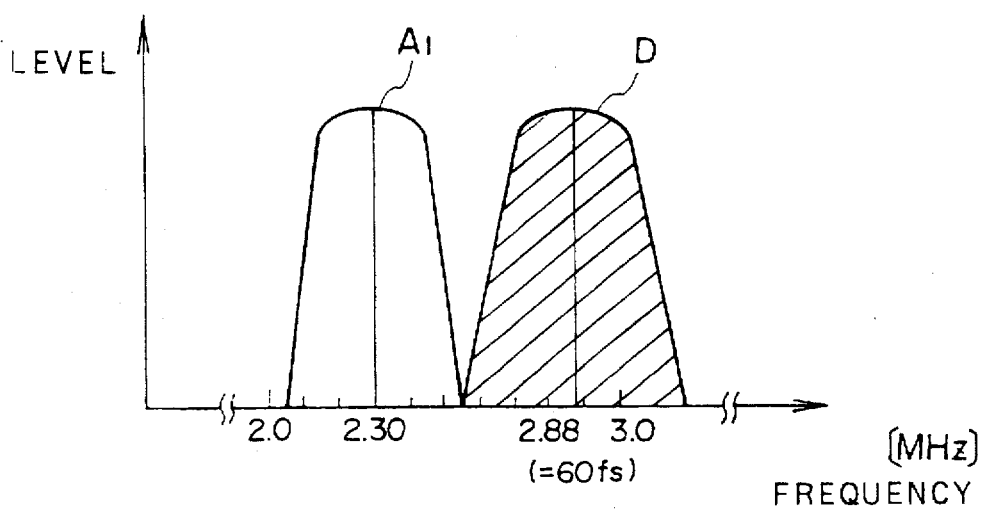

The spectrum of the signal in the present embodiment, in which the integer ratio of the sampling frequency is set so that the carrier wave has a frequency substantially same as that of the conventional case, is shown in FIG. 1B. At this time, the carrier wave frequency $f_{CD}$ related to the digital signal d is expressed as follows.

$$f_{CD} = 2.88 \text{ [MHz]} = 60 f_s = 5 \text{ times of the bit rate}$$

Next, the recording level is examined.

In the digital signal, if the recording level is low, the number of the bit errors is increased in due course. On the other hand, if the recording level is high, the disturbance to other analog signals becomes greater. Therefore, it is necessary to set the recording level to such a level that the error rate is sufficiently low within the range which does not give the disturbance.

Here, even if the digitally modulated carrier wave D is recorded with the recording level about 20 [dB] which is the same as the recording level of the audio FM carrier wave, the carrier to noise ratio C/N still has the signal recording level enough for practical use. Furthermore, it is possible to record with the recording level higher than this so as to improve the C/N ratio, while there is no practical problem even if the recording is performed with the recording level lower than this.

As described above, according to the first embodiment, it is possible to record the digital signal which is coded with high efficiency, in place of one channel for the audio signal with a sufficient margin. Thus, the software having the multi-channels coded with high efficiency, can be recorded and reproduced on the existing recording format for video discs, so that the recording and reproducing operation of the digital signal coded with high efficiency can be performed in the field of the video disc.

The first embodiment is such an example that the digital signal is modulated and superimposed on the video disc format including the EFM signal. However, the present embodiment can be applied to a format including only the analog signals without the EFM signal.

Furthermore, the present embodiment is such an embodiment in which superimposing is done onto the area for the audio FM carrier wave $A_2$. However, the digitally modulated carrier wave D may be inserted in place of the audio FM carrier wave $A_1$ to form the carrier with 2.30 [MHz] (48 fs). Alternatively, the double channels may be added as the digitally modulated carrier wave, to the area for both waves $A_1$ and $A_2$.

The recording format is not limited to the video disc. The present invention may be applied to another format, which does not have enough margin in the frequency band range since the video and audio signals etc. are multiplexed. At this time, the similar effect can be achieved by finely adjusting the carrier wave frequency by digitizing a half channel of the stereo sounds.

Further, the sampling frequency and the integer ratio are not limited to the values in the above embodiment, and may be varied to various values as long as the condition is fulfilled that the carrier wave has the integer ratio of the sampling frequency, as the special feature of the present invention. For example, assuming that the digital signal to be newly recorded is a signal sampled by the sampling frequency fs=44.1 [kHz] which is the same as that of the compact disc (CD), the change may be done as indicated by the following expression.

The frequency of the carrier wave of the digital signal: $f_{CD}$=2.87 [MHz]=65 $fs$ Further, as the digital modulation method, the QPSK method is assumed. However, other PSK methods (such as the π/4 QPSK method, the offset QPSK method and so on) may be employed, and it is also possible to superimpose a signal modulated by a method other than the PSK (for example, the ASK method, the FSK method and the QSK method) to the narrow band range.

As the digital signal coded with high efficiency, the AC-3 standard is assumed. However, other multiplexed multi channel information may be employed.

Second Embodiment

A second embodiment of the present invention is related to an information recording apparatus for recording the digital information, which is coded with high efficiency by the information recording method of the first embodiment of the present invention, onto a recording medium.

Figure 2A:
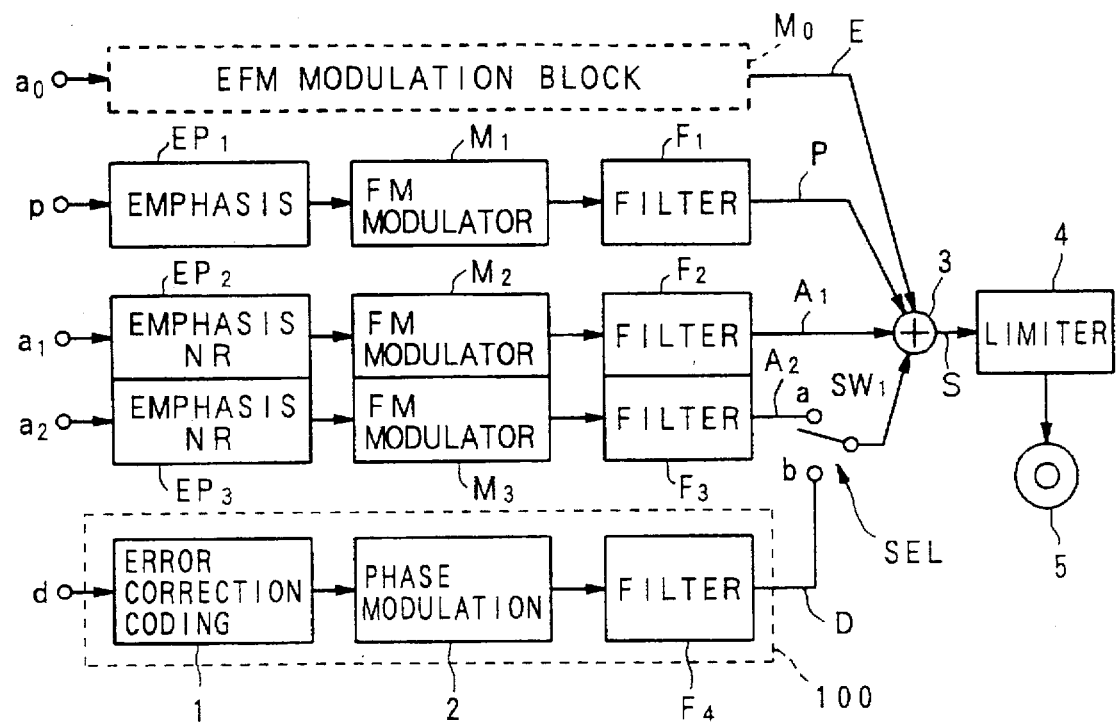
FIG. 2, which consist of FIG. 2A, and FIG. 2B, are block diagrams of an information recording apparatus and an information reproducing apparatus respectively, of the first embodiment.

The construction of the information recording apparatus of the second embodiment is shown in FIG. 2A, and 3A.

An EFM route system is provided with a EFM modulation block M0, to which an audio signal $a_0$ for stereo, and which performs the EFM modulation to output an EFM signal E.

The video route system is provided with: an emphasis circuit EP1 for emphasizing the outline of the video signal p; an FM modulator M1 for frequency-modulating it; and a filter F1.

The audio route system is provided with: emphasis NR circuits EP2 and EP3 for performing the noise reduction etc. of the audio signals $a_1$ and $a_2$; FM modulators M2 and M3 for frequency-modulating these signals; and filters F2 and F3.

The digital signal route system is provided with: an error correction coding block 1 for computing an error correction code of the digital signal d in the modulation block 100 and adding it to the digital signal d; a phase modulating block 2 for digital-phase-modulating the digital signal d; and a filter F4 for filtering the signal to pass only the digital signal frequency band range.

Further, the recording apparatus is provided with: a switch SW1 for switching the route system for the audio signal $a_2$ route and the route system for the digital signal d on the basis of the recording mode; an adder 3 for superimposing the signals modulated by each route system; and a limiter 4 for preventing the noise. Finally, the multiplexed signals are recorded onto a video disc 5 as a recording medium.

The concrete block diagram of the modulation block 100 is shown in FIG. 3A.

In FIG. 3A, the modulation block 100 is provided with: a receiving PLL (Phase Locking Loop) circuit 100 for receiving the digital signal d inputted in the form for the digital audio interface, detecting the AC-3 signal and achieving the synchronization by the PLL; an error correction coding circuit 11 for generating the AC-3 format data to be recorded by adding the error correction code, a sync-data and the ID data to the AC-3 signal; a ROM (Read Only Memory) address generating circuit 12, to which two digital data having the predetermined phase difference are inputted, for generating the address to read out the waveform data from a waveform generating ROM 13; the waveform generating ROM 13 for storing the modulated waveform data and generating the modulated waveform data corresponding to the inputted address; a D/A (Digital to Analog) convertor 14 for digital-to-analog-converting the modulated waveform data; a filter F4 for removing the high frequency wave; a dividing device 15 for dividing by 4 the standard oscillation (960 fs) which is in synchronization with the AC-3 signal generated in the receiving PLL circuit 10, to generate the address clock; a dividing device 16 for dividing by 4 the address clock to output the carrier wave frequency fc (60 fs); a dividing device 17 for dividing by 5 the carrier wave frequency fc to output the base band data frequency $f_B$ (12 fs); and a dividing device 18 for dividing by 2 the base band frequency $f_B$ to output the I-Q frequency $f_T$ corresponding to the I, Q data.

Nextly, the operation of the second embodiment will be explained.

IN CASE OF RECORDING THE CONVENTIONAL VIDEO DISC FORMAT DATA

The switch SW1 is switched to the a side automatically by the external microcomputer or manually.

In each of the EFM route system (related to the audio signal $a_0$), the video route system (related to the video signal p) and the audio signal route system (related to the audio signals $a_1$ and $a_2$), the modulation operation for recording an ordinary video disc is performed, and the record signal is generated.

Firstly, in the EFM route system, the analog audio signal $a_0$ is quantified by 16 bits to be the PCM signal in the EFM modulation block M0. Further, the PCM signal becomes the digital signal to which the error correction coding process and the interleaving process and the EFM modulation process etc. have been applied. The frequency component not lower than 2 [MHz] of the digital signal is removed by the low pass filter, is corrected to have the characteristic that the low range is raised up by the pre-emphasis circuit, and becomes the EFM signal E to be supplied to the adder 3.

In the video route system, the video signal p is frequency-corrected so as to improve the noise condition of the record signal by the emphasis circuit EP1. Then, in the FM modulator M1, the predetermined carrier wave (e.g. wave of 8.5 [MHz]) is frequency-modulated by the video signal p which has been frequency-corrected. Further, the filter F1 passes only the video signal frequency band range necessary for the frequency superimposing operation, to generate the video FM carrier wave P, which is supplied to the adder 3.

In the audio route system, the emphasis NR circuits EP2 and EP3 perform the frequency adjustment and the frequency compression for noise reduction with respect to the audio signals $a_1$ and $a_2$. In the ordinary video disc, the dynamic range of the reproduced sound is normally about 60 [dB], so that the S/N ratio can be improved and the dynamic range can be enlarged by use of the predetermined noise reduction method (e.g. the "CX noise reduction") as in the present embodiment. At this time, the controlling means which is not shown in the figure, records a status signal (e.g. 0 or 1) which indicates the fact that the noise reduction is used, to the user code area (for example, it is possible to record the vertical blanking period of the video signal, the lead in area or lead out area of the disc). In the FM modulators M2 and M3, the predetermined carrier wave is frequency-modulated by the audio signals $a_1$ and $a_2$, respectively. In the filters F2 and F3, the frequency-modulated audio signals are band-pass-filtered so as to have the level of −3 [dB] in the frequency band range Δf=100 to 150 [kHz], become the audio FM carrier waves $A_1$ and $A_2$ to be recorded and are supplied to the adder 3.

Here, in the FM modulators M2 and M3, the carrier wave frequency can be finely adjusted depending on whether the recording mode is for the ordinary analog audio signal or the AC-3 standard signal. In case of the recording mode for the ordinary analog audio signal, there is an integer multiple relationship with the horizontal synchronization signal frequency $f_H$ of the video signal P (for example, the carrier wave frequency of the audio signal $a_1$: $f_{CA1}$=2.30 [MHz]= 146.25 $f_H$, the carrier wave frequency of the audio signal $a_2$: $f_{CA2}$=2.81 [MHz]=178.75 $f_H$).

IN CASE OF RECORDING THE AC-3 FORMAT DATA

The switch SW1 is switched to the b side automatically by the external micro-computer or manually.

Firstly, the microcomputer not shown in the figure, records the status data (e.g. 0 or 1 bit information), which indicates the fact that the relevant disc 5 is the medium recorded with the digital signal coded with high efficiency, onto the user code area. This status signal is not the indispensable one for the present embodiment. Instead of this status signal, the difference in the recording method of the disc can be detected by judging whether the digital signal exists or not, or whether the carrier wave exists or not, in the reproducing apparatus.

To the digital modulation route system, the digital signal d coded with high efficiency, is supplied. After the digital modulating process by the modulation block 100, the AC-3 format data is supplied to the adder 3 through the switch SW1.

The operations of the EFM route system and the video route system, are the same as those in the recording method by means of the conventional video disc format, and the explanations thereof are omitted.

Here, the digital signal d coded with high efficiency is inputted to the modulation block 100. The analog audio signal having 5.1 channel volume is PCM-coded, and is coded with high efficiency by the encoder based on the AC-3 standard to generate the digital signal d. The generated digital signal d is serially inputted to the receiving PLL circuit 10 in the modulation block, by the predetermined bit rate (e.g. 3.072 [MHz]) through the digital audio interface such as an optical fiber.

In the receiving PLL circuit 10 at the initial stage, by achieving the synchronization by the digital signal d and the PLL operation, the predetermined multiple standard clock (e.g. 960 fs=46.08 [MHz] is outputted. On the other hand, only the AC-3 signal is extracted from the format signal for the digital audio interface etc., and is converted to the parallel data (e.g. 8 bit data).

Next, in the error correction coding circuit 11, a parity bit is added to this parallel data, and is interleaved with the digital data in order to cope with the burst error. As the error correction method, various coding method may be employed. For example, the lead solomon multiple coding method which has been employed in various medium, may be employed.

Finally, the error correction coding circuit 11 adds the sync signal and the ID signal for the convenience of the data transmission. The sync signal is constructed in a pattern which is easily extracted as the clock at the time of modulation by the QPSK method, and which has a high self correlation so as to be easily found with respect to other data signal. The ID signal is added as playing a role of the information indicating the line number etc. in the block which is the transmission unit of the digital data and as a role of the sub code.

The AC-3 format data completed in this manner, is converted to the serial data again from the parallel data, and is supplied to the ROM address generating circuit 12 to be PSK-modulated.

Further, the modulated waveform data which has been applied with the QPSK at the ROM address generating circuit 12 and the waveform generating ROM 13, is converted to the PCM code at the D/A convertor 14. Further, only the component of the digital carrier wave frequency fc, is extracted from this converted data by the filter F4, to become the digitally modulated carrier wave D, which has the frequency band range explained in the first embodiment. Then, the extracted signal is supplied to the adder 3. Here, it is superimposed together with the video FM modulated wave P, the audio FM modulated waves $A_1$ and $A_2$, and the EFM signal E by the adder 3, undergoes the waveform compression by the limiter 4 and is recorded onto the video disc 5.

OPERATION PRINCIPLE OF QPSK METHOD

The principle of the QPSK method and the operation of the QPSK method by the ROM reading technique of the present invention, will be explained with referring to FIGS. 4 to 6.

Figure 4A:
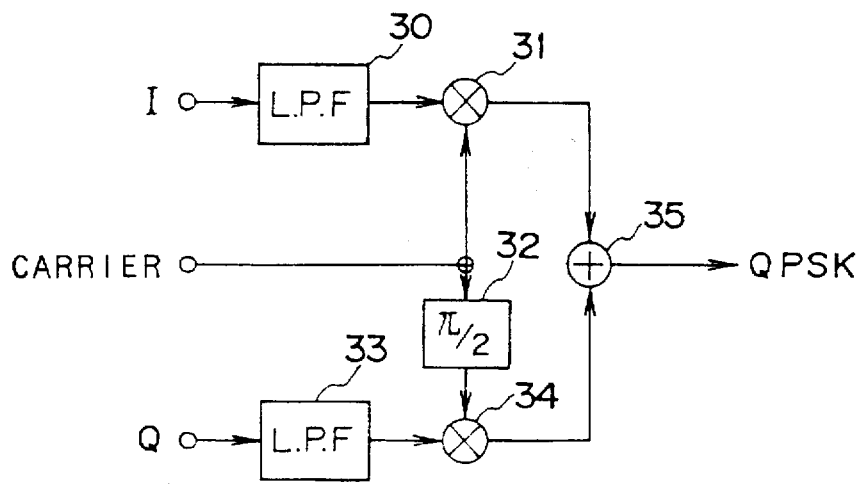
FIG. 4, which consist of FIG. 4A and FIG. 4B, are diagrams for explaining a principle of a QPSK modulation employed by the present embodiment.

FIG. 4A shows the principle of the QPSK method. Each of the data I and the data Q has the voluntary bit condition (i.e. 1 or 0). The high frequency component of each of the data I and Q is removed by the low pass filter 30, 33 respectively, and is inputted to the modulator 31, 34 respectively. The carrier (i.e. carrier wave) is directly inputted to the convertor 31 to be modulated, and is delayed in phase by π/2 by the delay circuit 32, to be inputted to the modulator 34. In correspondence with the bit conditions of the inputted data I and Q, the modulators 31 and 34 non-invert (for example, in case of bit "0") or invert (for example, in case of bit "1") the polarity of the carrier wave respectively to output the non-inverted or inverted output. The outputs of the modulator 31 and 34 are added at the adder 35.

Figure 4B:
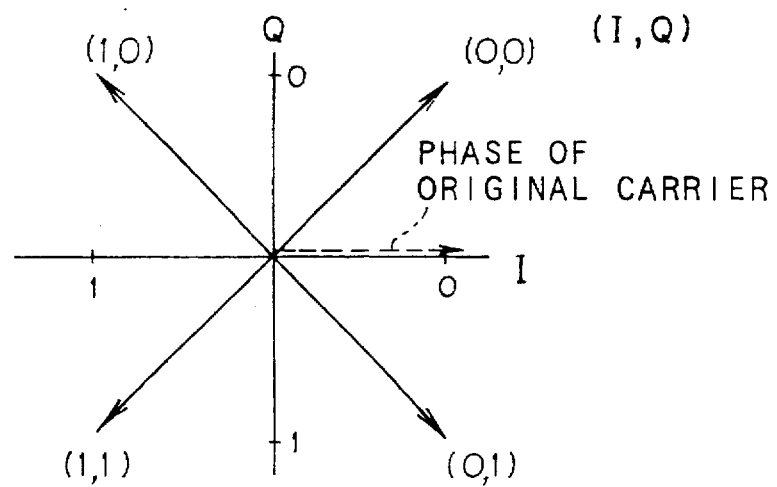

FIG. 4B is a figure indicating the modulated phase condition of the carrier wave. The phase of the original waveform of the carrier is indicated by the broken line in the figure, and is the same as that indicated in FIG. 4A, which is obtained by modulating the data I by the bit "0". Here, if the data Q is modulated by the bit "0", since the carrier related to the data Q is delayed in phase by $\pi/2$, the same frequency waveform shifted in phase by $\pi/2$ is added in the adder 35, so that the output has the phase (0,0) which equals to the vector sum of the both.

Nextly, if the data I becomes the bit "1" while the data Q remains the same, the carrier related to the data I is inverted i.e. becomes the signal delayed in phase by $\pi$. Thus, the total vector coincides with the same vector sum and has the phase (1,0). In the same manner, there are obtained 4 phase conditions in total by use of 2 bit data, as shown in FIG. 4B, this is the principle of the QPSK method.

On the other hand, in case of demodulating it, by detecting this phase condition of the signal which has been phase-modulated, in relation with the phase of the standard clock, the data can be demodulated to the original digital data of 2 bits. Therefore, in the QPSK method, one modulation phase is determined with the 2 bit data (I, Q) as the minimum unit (called "1 symbol" hereinbelow).

Nextly, the QPSK method of the present embodiment will be explained.

Figure 5:
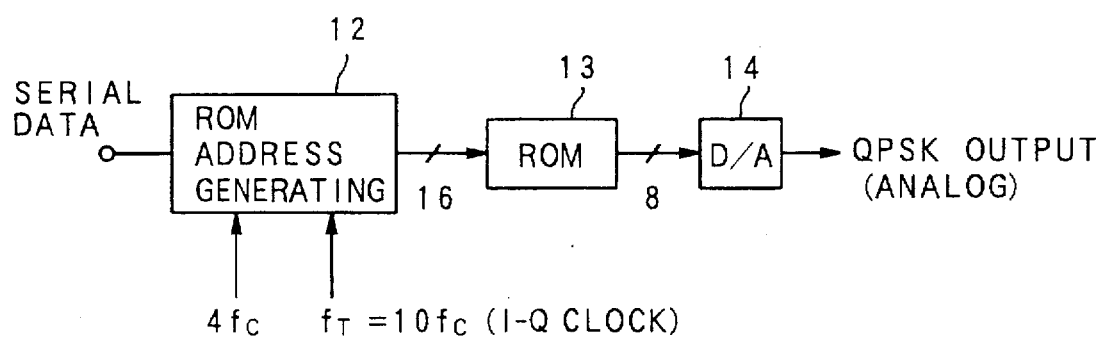
FIG. 5 is a block diagram of a QPSK modulator according to a second embodiment of the present invention.

FIG. 5 shows the constitutional elements related to the QPSK method extracted from the modulation block 100 of FIG. 3A. In FIG. 5, the base band data supplied as the serial data from the error correction coding circuit 11, is firstly code-converted at the ROM address generating circuit 12. Here, the "code-converting" is defined here as further adding the modulo 4 onto the base band data in order to obtain the original data directly at the delay wave detection used in the reproducing apparatus at the time of reproduction. By performing this addition of the modulo 4, all of the 4 phase conditions of the base band data are always included in one of the modulation wave respectively in case of performing the phase modulation by use of 5 symbols. Thus, in the delay wave detecting circuit, the 4 phase conditions can be relatively extracted relatively from each other, and the original data can be reproduced.

Now, in the ROM address generating circuit 12, 2 pieces of successively transmitted data in the serial data are separated from each other by the odd number and the even number in the transmission order. Then, two kinds of data i.e. the data I and the data Q are generated as the odd number data is the data I while the even number data is the data Q. Then, the ROM address generating circuit 12 judges the bit condition of one symbol, which is composed of one bit of the generated I data and one bit of the generated Q data, and generates the predetermined address of the wave generating ROM 13 in which the modulated waveform data having the corresponding modulated phase is stored, on the basis of the combination of these bits, so as to control the waveform generating ROM 13 to output the final modulated waveform.

However, in order to completely demodulate the digitally modulated wave in the strictly limited band range, it is preferable that the digital filter (for example, a root Nyquist filter (roll off filter)) is constructed in the demodulating apparatus. Thus, in the present embodiment, data corresponding to the volume of a plurality of symbols (e.g. 5 symbols) are treated as one set, and are outputted from the waveform generating ROM 13 altogether. Therefore, the waveform generating ROM 13 is required to store the modulated waveform data of 5 symbols together with respect to each set of the data of 5 symbols.

In other words, instead of generating the carrier wave having the phase corresponding to one symbol, the modulated waveform data block is stored to the waveform generating ROM 13 by the number of the combinations of the 5 symbol data (i.e. $(2^2)^5=2^{10}$) by use of the 4 bit conditions (since it is the combination of 2 bits of the I and Q data) per each symbol, where the modulated waveform data corresponding to 5 symbols are treated as one block. Then, the ROM address generating circuit 12 supplies the address of the waveform generating ROM 13 corresponding to one block determined from the bit condition per 5 symbols. The waveform generating ROM 13 reads out the data of 5 symbols from the lead of the data corresponding to the block after this address is supplied to it.

Here, the information volume necessary for the waveform generating ROM 13 is examined.

Firstly, the clock having the frequency which is 4 times of that of the carrier wave fc is inputted to the ROM address generating circuit 12, so that it is set as the timing to generate the address to the waveform generating ROM 13. Namely, by over-sampling by a frequency 4 times as high as that of the carrier wave, the modulated waveform generation is performed by the waveform generating ROM 13. Therefore, since the base band rate is composed of one symbol 2 bits by 576 [kbps], the rate becomes 288 [kbps] per one symbol. On the other hand, since the modulation frequency fc is 2.88 [MHz], the number of the carrier wave per 1 symbol is as following.

carrier wave frequency per 1 symbol=2.88 [MHz]/288 [kbps]=10 waves

Thus, assuming that one waveform data consists of 8 bits, the waveform data of 5 symbols become as following.

4 [sample/wave]×10 waves=40 [byte]

The waveform generating ROM 13 stores this 40 bytes data as one block to the continuous addresses from the predetermined address. Since the data volume corresponding to 5 symbols combination, is necessary as the total ROM capacity, the total ROM capacity becomes as following.

ROM capacity≧40 [byte]×2$^{10}$=40 [kbyte]

Thus, the generally used ROM (for example, 64 [kbyte] (512 [kbit]) ROM) can have the enough capacity for storing the data.

FIG. 6 shows an example of a modulated waveform output in the case of the modulated waveform output of 8 waves per 1 symbol. The code conversion from the base band data is performed by the modulo 4 addition. Further, the code-converted I and Q data are waveform-shaped by a low pass filter with the roll off of 100%, and then, the address generation and the modulated waveform generation will be performed.

As a method of specifying the address, there may be a method of specifying the arrangement of the data of 5 symbols as the high ranked address, if 1 block has a volume of more than 40 bytes.

As described above, according to the second embodiment, the QPSK method can be realized by use of the ROM, and the construction thereof is simplified. The adjustment or change of the waveform data can be dealt with by the change of the ROM, so that the degree of freedom is high.

If the relationship between the sampling frequency and the carrier wave frequency is not the integer multiple relationship, it is not practically possible to generate the read clock for the ROM, and further, the code change etc. cannot be easily performed In the above embodiment, the QPSK method is utilized as the modulation method. However, another PSK method (for example, 2 phase or 8 phase PSK) may be utilized just by changing the dividing ratio of the timing signal and the modulated waveform data in the waveform generating ROM. Further, as the symbol specifying method, the 5 symbol specifying method is employed. However, the symbol number may be changed to 7 symbols, 9 symbols etc., (here, it is to be noted that a large error is introduced to the 3 symbols).

Third Embodiment

The third embodiment of the present invention is related to an information reproducing apparatus for reproducing the information from the record medium to which the digital signal coded with high efficiency is recorded according to the information recording method of the present invention described in the first embodiment.

Figure 2B:
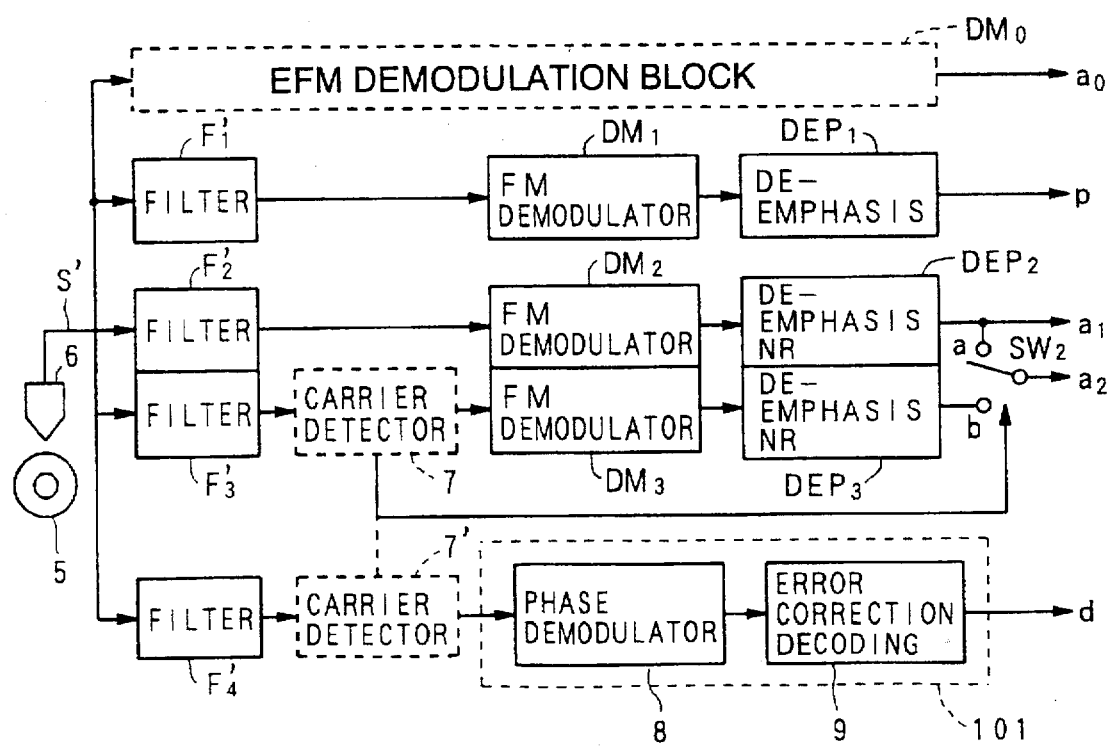

The construction of the information reproducing apparatus is shown in FIG. 2B and FIG. 3B.

In FIG. 2B, the information reproducing apparatus is provided with a pickup 6 for reading the information from a video disc 5 and outputting a superimposed signal S'; an EFM demodulation route system for demodulating the EFM signal to generate a stereo audio sound $a_0$; a video route system for demodulating the superimposed signal S' to generate a video signal p; an audio route system for demodulating the superimposed signal S' to generate audio signals $a_1$ and $a_2$; and a digital demodulating route system for demodulating the superimposed signal S' to generate a digital signal d coded with high efficiency.

The EFM demodulation route system includes an EFM demodulation block DMO. In the EFM demodulation block DMO, the signal is filtered to pass the frequency band range not higher than 2 [MHz] related to the EFM signal, and the low range characteristic is lowered by the de-emphasis so that it becomes a flat frequency characteristic. Then, it is converted into the PCM code by the digital encoder, and is D/A-converted to be outputted as the audio signal $a_0$.

The video route system is provided with: a filter F1' for filtering the input signal to pass the frequency band range of the video FM carrier wave P; an FM demodulator DM1 for demodulating the video FM carrier wave P, which has been frequency-modulated, to the video signal p; and a de-emphasis circuit DEP1 for correcting the noise reduction frequency characteristic of the video signal p.

The audio route system is provided with: filters F2' and F3' for filtering the input signal to pass the frequency band range of the audio FM carrier waves $A_1$ and $A_2$; FM demodulator DM2 and DM3 for demodulating the audio FM carrier waves $A_1$ and $A_2$, which have been frequency-modulated, to audio signals $a_1$ and $a_2$; de-emphasis NR circuit DEP2 and DEP3 for correcting the noise reduction frequency characteristics of the audio signal $a_1$ and $a_2$. If the case demands, the audio route system is further provided with a carrier detector 7 for detecting the existence of the carrier in the route system related to the audio signal $a_2$.

The digital signal route system is provided with a filter F4' for filtering the superimposed signal to pass only the band range of the digitally modulated carrier wave; a phase demodulator 8 for performing the digital-demodulation in the demodulation block 101; and an error correction decoding block 9 for performing the error correction to form the digital signal d.

In FIG. 3B, the demodulation block 101 is provided with: an A/D convertor 20 for converting the digitally modulated carrier wave D to the digital signal; a delay wave detecting circuit 21 for delay-wave-detecting the digital signal; a data distinguishing circuit 22 for converting the phase condition of the delay wave detection output to the bit conditions; an error correction decoding circuit 23 for performing the error correction of the distinguished data; a transmitter 24 for transmitting the demodulated digital signal D to the external in the format for the digital interface; an oscillator 25 for generating the standard clock; an automatic frequency controlling circuit 26 for comparing the output of the oscillator 25 and the frequency of the delay wave detected data with each other to achieve the frequency synchronization and dividing by 5 the standard clock; a dividing circuit 27 for dividing it into the base band data frequency $f_B$; and a dividing circuit 28 for generating the block read timing.

Nextly, the operation of the third embodiment will be explained.

Prior to the reproducing operation, the pickup 6 reads the status signal from the user area, and the microcomputer not shown in the figure, judges this status signal.

IN CASE OF REPRODUCING THE CONVENTIONAL VIDEO DISC

In case that the status signal indicates the conventional video disc, the switch SW2 is switched to the b side by the external microcomputer in FIG. 2B.

In each of the EFM route system (related to the EFM signal E), the video route system (related to the video FM carrier wave P) and the audio route system (related to the audio FM carrier waves $A_1$ and $A_2$), the modulating operation is performed in order to record the ordinary video disc, and the record signal is generated.

Firstly, in the EFM route system, the filter passes the signal having a frequency of not higher than 2 [MHz] in the EFM demodulation block DMO, and the de-emphasis circuit corrects it to have the frequency characteristic in which the low range is restrained. Further, the digital decoder performs the error correction, the digital decoding etc., and after the D/A conversion, it becomes the analog audio signal $a_0$ for stereo to be outputted.

In the video route system, the superimposed signal S' is filtered by the filter F1' to pass therethrough only the video FM carrier wave P, and is formed into the video signal p by the FM demodulator DM1. Further, the video signal p is corrected in its frequency characteristic by the de-emphasis circuit DEP1 to be outputted.

In the audio route system, the filters F2' and F3' filters the superimposed signal S' to pass therethrough only the audio FM carrier waves $A_1$ and $A_2$. Then, the FM demodulator DM2 and DM3 demodulates them to output the audio signals $a_1$ and $a_2$.

Next, in case that the status signal read in advance, indicates the validity of the noise reduction, the de-emphasis NR circuits DEP2 and DEP3 correct the frequencies of the audio signals $a_1$ and $a_2$ which have been frequency compressed.

IN CASE OF REPRODUCING VIDEO DISC RECORDED BY AC-3 FORMAT

In case that the status signal for disc judgement, indicates the video disc recorded by the AC-3 format, the switch SW2 is switched to the a side by the external microcomputer.

The operations in the EFM route system and the video route system are the same to the above mentioned case for reproducing the conventional video disc, and the explanations thereof are omitted.

The analog audio signals $a_1$ and $a_2$ become monophonic signals since the signal demodulated form the audio FM carrier wave $A_1$ is used as the output for both of those routes.

Next, the operations of the route systems related to the digitally modulated carrier wave D will be explained.

Firstly, the digitally modulated carrier wave D which has been digitally-modulated beforehand, is converted to a pulse waveform by the A/D convertor 20. In the A/D convertor 20, so-called analog to digital conversion (PCM coding) is not performed, but the pulse wave is obtained which is shaped by applying the limiter to the carrier wave, so as to be in the waveform in which phase can be easily compared.

On the other hand, the oscillator 25 performs the standard oscillation of 960 fs by the self excitation type oscillating operation. Normally, at the digital input stage, the synchronization of the phase of the input signal and the phase of the internal oscillation is achieved by a circuit such as a PLL. In case of the video disc, since the frequency change in the carrier wave is so small, it is enough to form the standard clock by use of the self excitation type oscillation in the delay wave detection. The background of setting the clock in this simple manner, originates from the fact that the relationship between the sampling frequency of the digital signal coded with high efficiency and the frequency of the carrier wave is the integer multiple relationship.

The delay wave detecting circuit 21 constitutes a differential self correlation wave detecting circuit to demodulate the signal modulated by the PSK method. This is operated on the principle that, by multiplying the present PSK wave by the delayed PSK wave one data before it, the output is not changed if there is no change in these two conditions, and the output is changed if there is a change in these two conditions. Since the present embodiment employs the QPSK method, the conditions of the successive 4 bits are compared with each other, are further distinguished by the data distinguishing circuit 22 which phase the data in the comparison output has, and are finally formed into the serial data by demodulating them into bit conditions of two bits determined by the first phase condition. This demodulated digital data coincide with the data based on the AC-3 format before the modulation.

The error correction decoding circuit 23 performs the error correction demodulation of the AC-3 format data by use of the error correction code of the AC-3 format data, and the completely demodulated AC-3 format data is extracted by the transmitter 24, is converted to the data in the predetermined format for the digital audio interface, is supplied to an external decoder for AC-3 format by a predetermined transmission rate (e.g. 3.072 [MHz]), and is converted into the analog data.

According to the third embodiment, the demodulating circuit can be easily constructed by digital processing elements, and the reproduction can be performed by reading the digital data coded with high efficiency from the video disc. Further, since it is relatively easy to judge the kinds of discs, both of the ordinary video disc and the video disc to which the digital data coded with high efficiency is superimposed, can be reproduced by a single reproducing apparatus. Furthermore, since the relationship between the sampling frequency and the frequency of the carrier wave is the integer multiple relationship, the PLL circuit for achieving the synchronization, the memory for adjusting the speed etc., are not necessary, so that the design of the circuit is rather easy and the stability of the circuit operation is high.

In the present embodiment, the judgement of the kind of video discs is performed by use of the status signal. However, this judgement may be performed by equipping the route system related to the audio signal $a_2$ with a carrier detector 7 (indicated by a broken line in FIG. 2B) or by equipping the route system related to the digital signal d with a carrier detector 7' to detect the existence of the carrier wave. Further, this judgement may be performed by use of an error detection signal of the drop-out correction circuit (DOS) of the FM demodulator DM3. Particularly, since the phase change of the QPSK method is very steep in the present embodiment, the drop-out correction circuit works quite well here, so that this method of judging by use of the error detection signal is effective in the case where the frequencies of the audio FM carrier wave and the digitally demodulated carrier wave D are too close to distinguish and detect them.

By the action of this drop-out correction circuit, even if the digitally modulated carrier wave D would be mixed into the audio signal route system, the drop-out can be easily detected and there is little possibility to output it as a noise.

Fourth Embodiment

In each of the above explained embodiments, the addition of the new information with respect to the carrier wave band range of the audio signal is performed. The fourth embodiment is directed to an information recording method and an information recording and reproducing apparatus in which the information signal is superimposed to an empty area of the video signal while the video signal is kept as it is.

The signal spectrum in the fourth embodiment according to the information recording method of the present invention is shown in FIG. 7.

Figure 7A:
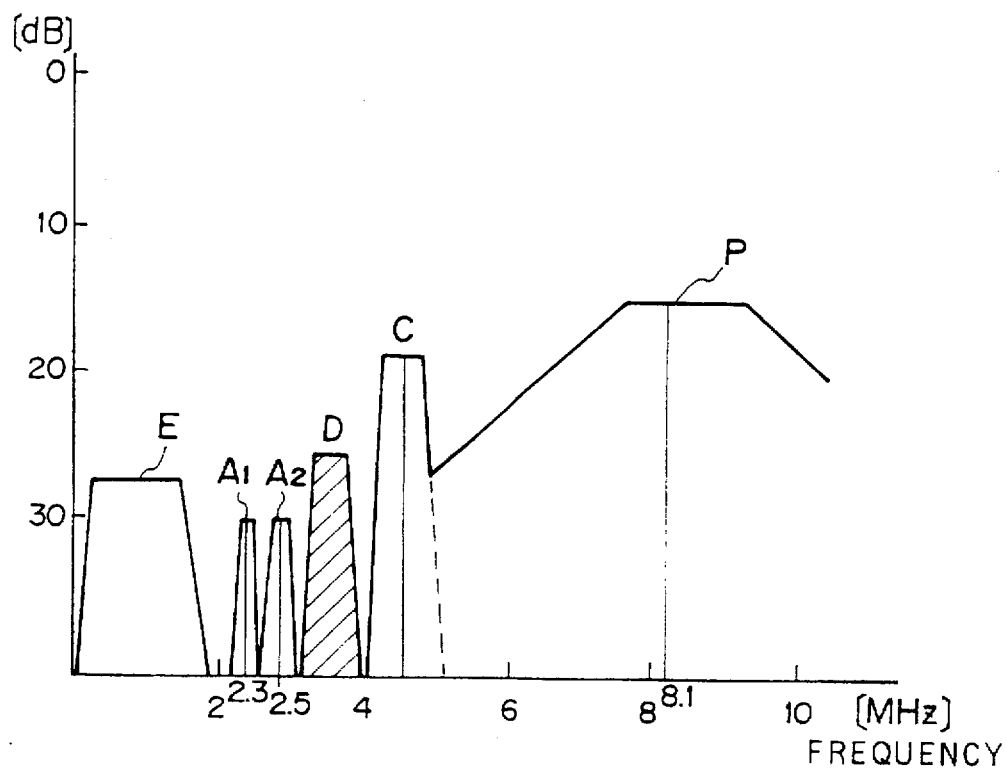
FIG. 7, which consist of FIG. 7A and FIG. 7B, are graphs each showing a spectrum of a record signal according to a fourth embodiment of the present invention.

In FIG. 7A, a reference mark P denotes a video FM carrier wave, and C denotes the band for the color side on the lower side. Reference marks $A_1$ and $A_2$ denote audio FM carrier waves, and E denotes the EFM signal. Each of the carrier wave frequencies are the same as those in the conventional format. A reference mark D denotes the band obtained by modulating an additional information d and superimposing it according to the present embodiment.

The video signal consists of a horizontal synchronization signal, a color burst signal (color sub carrier wave) and a composite signal regardless of the types of television method (for example, each television method of NTSC, PAL, SECAM). The frequency characteristic of the video period i.e. the period in which the composite signal exists, occupies the wide band range with a center at the frequency of the carrier wave 8.5 [MHz], and the information exists to the vicinity of 3 [MHz] where the audio FM carrier wave exists, as indicated by a solid line of the video period P in FIG. 7B. Namely, the frequency of the luminance signal is getting high due to the recent upgrade in the image quality. For example, at the stage before the modulation, the frequency around 5 [MHz] exists. Thus, since the frequency of the blanking level is 8.1 [MHz], the frequency on the lower range side exists as lower as the following frequency (the lower edge of the BW1).

$$8.1 - 5 = 3.1 \text{ [MHz]}$$

Figure 7B:
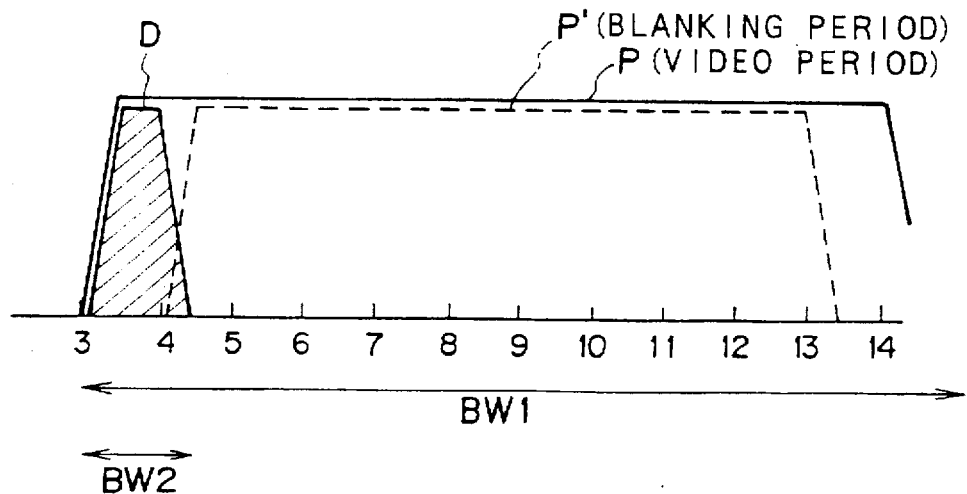

However, during the blanking period where the video signal does not exist, the frequency band range is narrowed as indicated by a broken line in FIG. 7B. For example, in the NTSC method, since the burst frequency is 3.58 [MHz], assuming that the frequency band range due to the burst change is 0.5 [MHz], the frequency of the lower side becomes as the following.

$$8.1-3.58-0.5=4.02 \text{ [MHz]}$$

Accordingly, it is understood that there does not exist the signal spectrum from 3 to 4 [MHz] in the band range (BW2).

Therefore, by use of the blanking period, there exists a room to superimpose the additional information D at this empty range BW2.

FIG. 8 is a figure for explaining an information recording and reproducing apparatus for performing recording and reproducing the additional information by use of this empty range.

Figure 8A:
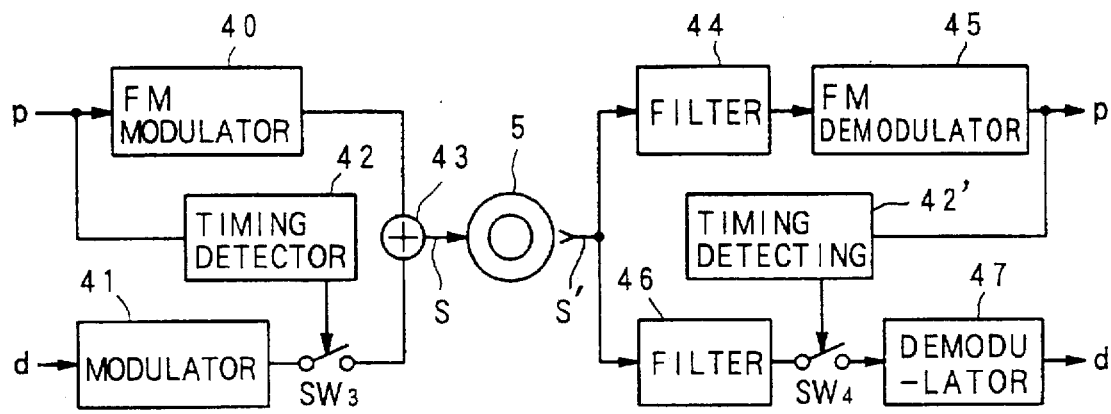
FIG. 8, which consist of FIG. 8A, FIG. 8B and FIG. 8C, are diagrams for explaining an information recording and reproducing apparatus according to the fourth embodiment.

The block diagram of the information recording and reproducing apparatus of the fourth embodiment is shown in FIG. 8A.

In FIG. 8A, the recording apparatus is provided with: an FM modulator 40 for frequency-modulating a video signal p; a demodulator 41 for demodulating the additional information d; a timing detecting unit 42 for generating a switching pulse to superimpose the additional information; a switch SW3 for adding the additional information d, which is modulated in accordance with the switching pulse generated by the timing detecting unit 42, to an adder 43; and the adder 43 for adding the video FM carrier wave on the carrier wave and the modulated additional information d to generate an superimposed signal S.

On the other hand, the reproducing apparatus is provided with: a filter 44 for passing only the frequency band range BW1 in the horizontal synchronization blanking period, among the reproduced signal S' which is reproduced from the video disc 5 by a pickup which is not shown in the figure; an FM demodulator 45 for demodulating the video FM carrier wave, which has passed through the filter 44; a filter 46 for passing only the frequency band range BW2 in the empty range, among the reproduced signal S'; a timing detecting unit 42' for supplying the switching pulse to the switch SW4 only during the blanking period; a switch SW4 for connecting the output of the filter 46 to the external in correspondence with the switching pulse supplied from the timing detecting unit 42'; and a demodulator 47 for demodulating the signal supplied through the switch SW4 to output the additional information d.

Figure 8B:
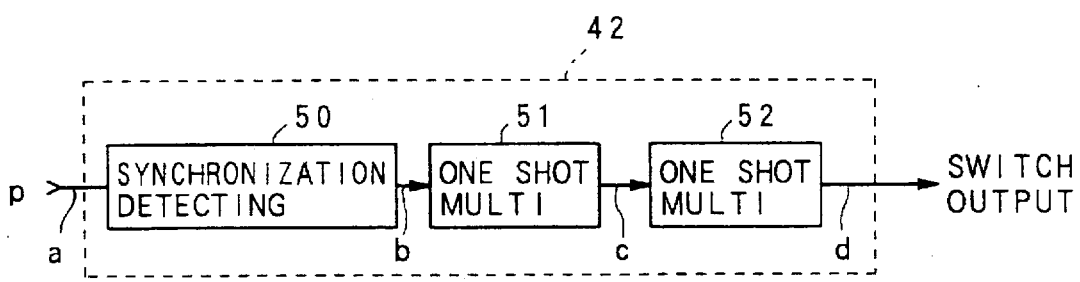
Figure 8C:
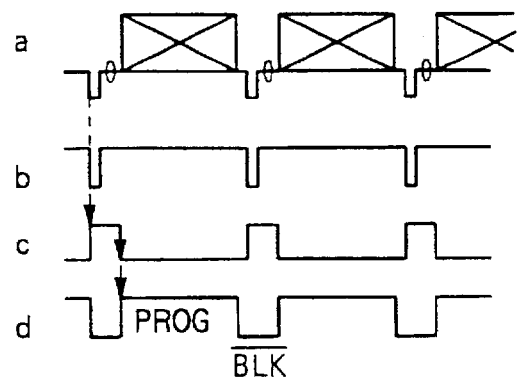

The timing detecting units 42 and 42' are of similar construction. As shown in FIG. 8B, each of these units is provided with: a synchronization detecting (separating) circuit 50; a one shot multi vibrator 51 which uses the separated blanking pulse as the trigger pulse; and a one shot multi vibrator 52 for further processing the output of the one shot multi vibrator 51.

The operation of the present embodiment will be nextly explained.

In the recording apparatus, when the video signal p (a waveform in FIG. 8C) is inputted to the timing detecting unit 42, the synchronization detecting circuit 50 firstly separates the blanking pulse (b waveform in FIG. 8B). Then, the one shot multi vibrator 51 generates the pulse (c waveform in FIG. 8C) which has the period ended immediately before the image signal (i.e. program area) with using the blanking pulse as the trigger pulse. Further, the one shot multi vibrator 52 generates the pulse which distinguishes the image signal period and the blanking period (d waveform in FIG. 8).

As for the construction of the timing detecting unit, a pulse generation circuit by use of a counter, may be employed in place of the one shot multi vibrator.

On the other hand, the predetermined additional signal d is modulated within the range of the frequency band range BW2 by the modulator 41, and is supplied to the switch SW3. The switch SW3 is switched ON only during the blanking period by the switching pulse of the timing detecting unit 42, and the output of the switch SW3 is superimposed on the video FM signal in the adder 43.

In the reproducing apparatus, the filter 44 passes all of the frequency band range of the video FM carrier wave, and the FM demodulator 45 performs the demodulation to generate a video signal p. Then, the timing detecting unit 42' generates the switching pulse from the video signal p in the same manner as the operation of the timing detecting unit 42 in the recording apparatus. On the other hand, the filter 46 passes only the frequency band range BW2 of the superimposed additional signal d. Thus, only the additional information d, which is superimposed and time-divisional-multiplexed, is separated and reproduced through the switch SW4, which is opened and closed in accordance with the switching pulse.

The additional information may be digital data coded with high efficiency as in the above explained embodiments, or may be analog data. Various modulating method may be employed to the present embodiment. For example, as for the analog signal, various modulating method such as AM, FM and PM, may be employed. As for the digital signal, various modulating method such as ASK and PSK may be employed in the embodiments.

In the above described embodiment, although the horizontal blanking period is utilized, the composite blanking period may be utilized instead.

According to the fourth embodiment, by performing the time axis processing and a frequency axis processing simultaneously, the new information can be added without changing the existing format by effectively using the empty range. Therefore, the present embodiment can be applied to various video record medium commonly. For example, as the record medium, it can be applied to a VTR, a video floppy etc. other than the video disc.

As for the kinds of information, besides the digital signal, the additional video information which is formed by analog-modulating the video signal, can be superimposed.

OTHER MODIFIED EMBODIMENTS

The present invention is not limited to the above embodiments, but can be applied in various manner.

Firstly, the existing recording format as the object is not limited to the format used in the above embodiments. In the format, either of the audio signals may be replaced by the digital signal coded with high efficiency. As for the modulation method, although the QPSK method is utilized in the above embodiments, the present invention is applicable to the other method of the PSK method, the offset PSK method, 2 phase or 8 phase PSK method and so on.

Further, the digital data coded with high efficiency is not limited to the digital audio information of the AC-3 standard etc., but it may be other information based on a format which fulfills the record capacity of the recording medium and the transferring speed. For example, the super letter information, the message of the producer, the effective sound information in the game, the control information related to the computer, etc., may be inserted besides the audio digital information.

As described above, according to the first embodiment, the digital signal coded with high efficiency can be recorded in place of the audio signal. The convenient recording method for the design of the modulating and demodulating circuit can be obtained, since the frequency of the carrier wave and the sampling frequency have the integer multiple ratio.

According to the second embodiment, the information recording apparatus which can multiplex the digital signal coded with high efficiency by means of the recording methods of the present invention. The modulating circuit can be made simplified, since the sampling frequency is integer-multiplied to be the carrier wave, and the waveform generation of the QPSK method can be performed by the timing of integer multiple of the sampling frequency.

According to the third embodiment, the record medium recorded by the recording methods of the present invention can be reproduced, while the compatibility in the reproduction can be achieved with the recording medium by the conventional recording method.

According to the fourth embodiment, recording and reproducing the recording medium can be performed with respect to the recording medium recorded by the recording methods of the present invention, and it becomes possible to provide the recording and reproducing circumstance capable of multiplexing the digital signal coded with high efficiency.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A video and audio information recording method of recording a plurality of analog audio signals in a stereo format to be recorded onto one record medium and multiplexed on a frequency axis by assigning the analog audio signals respectively to a plurality of channels prescribed by carrier waves which have frequencies different from each other, wherein a digital stereo audio signal is assigned to one of the plurality of channels in place of one audio signal so as to be multiplexed on the frequency axis, the digital stereo audio signal is sampled by a predetermined sampling frequency, and the carrier wave prescribing the channel assigned to the digital stereo audio signal has a frequency which is an integer multiple of the predetermined sampling frequency.

2. An information recording method according to claim 1, wherein at least one of a video signal and a digital EFM signal are recorded on said one record medium besides said audio signal and said digital signal.

3. An information recording method according to claim 1, wherein a monophonic audio signal is recorded to the other of the plurality of channels.

4. An information recording method according to claim 1, wherein the digital signal is modulated by a PSK (Phase Shift Keying) method.

5. A video and audio recording apparatus for recording a plurality of analog audio signals in a stereo format to be recorded onto one record medium and multiplexed on a frequency axis by assigning the analog audio signals respectively to a plurality of channels prescribed by carrier waves which have frequencies different from each other, said information recording apparatus comprising:

an error correction coding means, to which an input digital signal sampled by a predetermined sampling frequency is inputted, for adding an error correction code to the input digital signal and generating a digital stereo audio signal for recording;

a digitally modulating means for digitally-modulating the digital stereo audio signal for recording by a carrier wave for digital modulation, wherein said digital stero audio signal is assigned to one of the plurality pf channels in place of one analog audio signal, a filtering means for filtering the digital stereo audio signal for recording, which is digitally-modulated by said digitally modulating means; and a frequency multiplex means for multiplexing the filtered digital stereo audio signal on the frequency axis, wherein the carrier wave for digital modulation has a frequency which is an integer multiple of the predetermined sampling frequency.

6. An information recording apparatus according to claim 5, wherein said digitally modulating means comprises:

a timing generator means for generating a timing signal on the basis of the predetermined sampling frequency;

a waveform address generating means, to which the digital stereo audio signal for recording is inputted on the basis of the timing signal, for generating an address corresponding to the digital stereo audio signal for recording;

a waveform storing means for storing a plurality of QPSK (Quad PSK) waveform data, and generating one QPSK waveform data corresponding to the address generated by the waveform address generating means; and a D/A converting means for digital-to-analog converting the QPSK waveform data generated from said waveform storing means.

7. A video and audio reproducing apparatus for reproducing a record medium, which is recorded by an information recording method of recording a plurality of analog audio signals in a stereo format to be recorded onto the record medium and multiplexed on a frequency axis by assigning the analog audio signals respectively to a plurality of channels prescribed by carrier waves which have frequencies different from each other, wherein a digital stereo audio signal is assigned to one of the plurality of channels in place of one analog audio signal so as to be multiplexed on the frequency axis, said information reproducing apparatus comprising:

a reading means for reading signals from the record medium;

a filtering means for filtering the read signals to pass only a predetermined modulated carrier wave, so as to be de-multiplexed on the frequency axis;

a digitally demodulating means for demodulating the predetermined modulated carrier wave to generate a demodulated digital signal; and an error correction decoding means, to which the demodulated digital signal is inputted, for performing an error correction decoding operation to output a complemented digital signal, wherein the digital signal is sampled by a predetermined sampling frequency, and the carrier wave prescribing the channel assigned to the digital signal has a frequency which is an integer multiple of the predetermined sampling frequency when the record medium is recorded by the information recording method.

8. An information reproducing apparatus according to claim 7, further comprising a carrier detecting means for detecting whether the carrier wave prescribing the channel assigned to the digital signal is read by said reading means or not, to judge a type of the record medium, said information reproducing apparatus performing a reproduction in accordance with the type of the record medium judged by said carrier detecting means.

9. A video and audio recording and reproducing apparatus comprising an information recording apparatus and an information reproducing apparatus, said information recording apparatus recording a plurality of analog audio signals in a stereo format to be recorded onto one record medium and multiplexed on a frequency axis by assigning the analog audio signals respectively to a plurality of channels prescribed by carrier waves which have frequencies different from each other, wherein a digital stero audio signal is assigned to one of the plurality of channels in place of the analog audio signal, said information recording apparatus comprising:

an error correction coding means, to which an input digital signal sampled by a predetermined sampling frequency is inputted, for adding an error correction code to the input digital signal and generating a digital signal for recording;

a digitally modulating means for digitally-modulating the digital signal for recording by a carrier wave for digital modulation, which prescribes one of the plurality of channels;

a filtering means for filtering the digital signal for recording, which is digitally-modulated by said digitally-modulated by said digitally modulating means; and a frequency multiplex means for multiplexing the digital signal on the frequency axis, wherein the carrier wave for digital modulation has a frequency which is an integer multiple of the predetermined sampling frequency, said information reproducing apparatus comprising;

a reading means for reading signals from the record medium;

a filtering means for filtering the read signals to pass only a predetermined modulated carrier wave, so as to be de-multiplexed on the frequency axis;

a digitally demodulating means for demodulating the predetermined modulated carrier wave to generate a demodulated digital signal; and an error correction decoding means, to which the demodulated digital signal is inputted, for performing an error correction decoding operation to output a complemented digital signal.

10. An information recording and reproducing apparatus according to claim 9, wherein the digital signal is sampled by a predetermined sampling frequency, and the carrier wave prescribing the channel assigned to the digital signal has a frequency which is integer multiple of the predetermined sampling frequency when the record medium is recorded by the information recording apparatus.

11. An information recording and reproducing apparatus according to claim 9, wherein said digitally modulating means comprises:

a timing generator means for generating a timing signal on the basis of the predetermined sampling frequency;

a waveform address generating means, to which the digital signal for recording is inputted on the basis of the timing signal, for generating an address corresponding to the digital signal for recording;

a waveform storing means for storing a plurality of QPSK (Q-PSK) waveform data, and generating one QPSK waveform data corresponding to the address generated by the waveform address generating means; and a D/A converting means for digital-to-analog converting the QPSK waveform data generated from the waveform storing device.

12. An information recording and reproducing apparatus according to claim 9, wherein said information reproducing apparatus further comprises a carrier detecting means for detecting whether the carrier wave prescribing the channel assigned to the digital signal is read by said reading means or not, to judge a type of the record medium, said information reproducing apparatus performing a reproduction in accordance with the type of the record medium judged by said carrier detecting means.

* * * * *